US006303549B1

(12) United States Patent
Burdzy et al.

(10) Patent No.: US 6,303,549 B1
(45) Date of Patent: Oct. 16, 2001

(54) FLUORINATED AEROSOL LUBRICATING COMPOSITIONS

(75) Inventors: Matthew P. Burdzy, South Windsor; Sandra C. Adams, East Hampton, both of CT (US)

(73) Assignee: Loctite Corporation, Rocky Hill, CT (US)

(*) Notice: Subject to any disclaimer, the term of this patent is extended or adjusted under 35 U.S.C. 154(b) by 0 days.

(21) Appl. No.: 09/787,431

(22) PCT Filed: Sep. 24, 1999

(86) PCT No.: PCT/US99/22150

§ 371 Date: Mar. 26, 2001

§ 102(e) Date: Mar. 26, 2001

(87) PCT Pub. No.: WO00/18849

PCT Pub. Date: Apr. 6, 2000

Related U.S. Application Data

(60) Provisional application No. 60/102,280, filed on Sep. 29, 1998.

(51) Int. Cl.[7] .................... C10M 131/08; C10M 111/04; C07C 45/00

(52) U.S. Cl. ............................. 508/582; 508/588; 72/42; 568/463

(58) Field of Search .................................. 508/582, 588; 72/42; 568/463

(56) References Cited

U.S. PATENT DOCUMENTS

| 3,962,348 | * | 6/1976 | Benninger et al. | 508/582 |
|---|---|---|---|---|
| 5,393,442 | * | 2/1995 | Buchwald et al. | 508/582 |
| 5,839,311 | * | 11/1998 | Grenfell et al. | 508/582 |
| 5,908,817 | | 6/1999 | Perettie et al. | 508/422 |
| 5,908,917 | * | 6/1999 | Perettie et al. | 508/582 |
| 5,939,311 | | 11/1998 | Grenfell et al. | 72/42 |
| 6,043,201 | * | 3/2000 | Milbrath et al. | 508/582 |

FOREIGN PATENT DOCUMENTS

| 302318-A | * | 2/1989 | (EP) . | |
|---|---|---|---|---|
| 0 302 318 | | 2/1989 | (EP) | C10M/111/04 |

* cited by examiner

*Primary Examiner*—Jacqueline V. Howard
(74) *Attorney, Agent, or Firm*—Steven C. Bauman

(57) ABSTRACT

Aerosol compositions containing fluorinated oils are disclosed. At least one fluorinated component compatible with the fluorinated oil and a propellant are included in the aerosol composition. Fluorinated oil-containing non-aerosol compositions are also disclosed. In a particularly desirable form, the compositions are single-phase.

30 Claims, No Drawings

FLUORINATED AEROSOL LUBRICATING COMPOSITIONS

This application is a 371 of PCT/US99/22150 filed Sep. 24, 1999 which claims benefit of No. 60/102,280 filed Sep. 29, 1998.

BACKGROUND OF THE INVENTION

1. Field Of The Invention

The present invention relates to aerosol compositions containing fluorinated oils, which are used for lubricating applications. More particularly, the present invention relates to aerosol compositions including perfluoroalkylpolyether oils, which when sprayed under ambient conditions onto an substrate surface do not cause the substrate temperature to drop, thereby causing the moisture to freeze on the substrate and immobilize the composition.

2. Brief Description Of Related Technology

Perfluorinated oil lubricants have many desirable advantages over common petroleum-based lubricants. For instance, fluorinated lubricants are particularly useful in high temperature applications in which chemical resistance, thermostability, non-flammability and non-combustibility characteristics are desirable. Due to their inherent chemical inertness, they serve extremely well in applications involving the industrial maintenance, repair and operations areas ("MRO"), where lubricants are subjected to the extreme demands placed on machinery. Whereas elevated temperatures, aggressive chemicals, flammable conditions and airborne contaminants in typical MRO applications can quickly exceed the performance capabilities of many petroleum lubricants, fluorinated lubricants do not suffer from these limitations.

To date, the ability to deliver a perfluorinated or highly fluorinated oil lubricant in aerosol form has been hampered by several technical difficulties. To begin with, aerosol compositions generally require miscibility of the respective components in the compositions. Perfluorinated oils and other highly fluorinated oil lubricants are not generally soluble in most common organic solvents employed in aerosol compositions. Although perfluorinated solvent compounds may be used to dissolve perfluorinated oils into solution, these perfluorinated solvent materials are extremely expensive and not practical from a commercial industrial viewpoint. Thus, one technical difficulty to overcome is finding an inexpensive solvent composition, which both satisfies the miscibility requirement and quickly evaporates once the oil has been sprayed and delivered to a substrate. The solvent may desirably also possess a balance of other properties required of a commercially viable aerosol product such as being non-flammable and not combustible.

Moreover, when attempts to make aerosol compositions containing perfluorinated or highly fluorinated oils have been made, the resultant aerosol spray exhibited severe freezing of the composition on the substrate surface. The freezing of the composition when sprayed onto a part is problematic since the perfluorinated oil is not released from the frozen composition until the composition completely melts. This is particularly problematic for penetrating oil compositions designed to penetrate narrow gapped spaces, such as between the threads of a standard 3/16" (4.57 mm) nut and bolt. Even in instances where complete freezing does not occur, the viscosity of the oil-containing composition increases to a point where penetration of the composition into narrow gaps is not possible. When the frozen composition eventually melts, the flowability of the oil is still effected since its normal penetration flow has been interrupted.

At least for the reasons expressed above, aerosol compositions containing perfluorinated or highly fluorinated oils are not currently on the market. However, aerosol or spray forms of these compositions would not only be convenient to the user, but in many cases would be the best method of delivering the oil to a surface. It would be desirable to provide a solution to the above-mentioned problems, particularly as regards to finding a suitable and cost effective solvent for perfluorinated oils, as well as discovering the ratios of components in the resultant oil-containing composition which permit a non-freezing aerosol spray to be made.

SUMMARY OF THE INVENTION

In one embodiment of the present invention there is included an aerosol composition which includes a fluorinated oil, such as a perfluorinated or highly fluorinated oil; a least one fluorinated component compatible with the oil; and a propellant. These components are combined in a ratio, which provides a non-icing or non-freezing film when sprayed onto a substrate at ambient conditions.

The perfluorinated and highly fluorinated oils of the inventive compositions include a wide variety of materials. One such particularly useful class of materials are the commercially available perfluorinated oils sold under the trademark KRYTOX by Dupont which correspond to the formula $F[CF(CF_3)CF_2O]_nCF_2CF_3$, wherein n is an integer from 10 to 60. Among the fluorinated components to be added which are compatible with the oil are the highly fluorinated alkanes having from 4 to 10 carbon atoms. One particularly useful highly fluorinated component is decafluoropentane, which is commercially available under the tradename VERTREL XF sold by Dupont.

The compositions of the present invention are desirably single-phase compositions, which are made by selectively determining the ratios of components, which can achieve this physical form. Dispersions, emulsions and other combinative forms, however, may be useful. The present invention further contemplates an article of manufacture which includes a container for packaging a flowable composition; and a flowable composition within the container, the composition including a fluorinated oil, at least one fluorinated component compatible with the oil and a propellant. The ratio of fluorinated oil to the fluorinated component is most desirably selected in a range to provide a single-phase composition.

DETAILED DESCRIPTION OF THE INVENTION

The perfluorinated oils of the present invention maybe selected from a wide variety of perfluorinated and highly fluorinated oils. Among those useful include those which correspond to one of the general compounds selected from $CF_3CF_2CF_2O$—$[CF(CF_3)CF_2$—$O$—$]_nCF_2CF_3$, $CF_3O$—$[CF(CF_3)CF_2$—$O$—$]_y$—$[CF_2$_$O]_mCF_3$, $CF_3O$—$[CF_2CF_2$—$O$—$]_z$—$[CF_2$—$O$—$]_pCF_3$, $CF_3CF_2CF_2$—$O$—$[CF_2CF_2CF_2$—$O$—$]_qCF_2CF_3$, halocarbons containing the repeating group —$(CF_2CFCl)_r$— and having an average molecular weight of from about 230 to about 1200 and combinations thereof; where n is an integer from 0 to 60; y is an integer from 0 to 60; m is an integer from 0 to 60; z is an integer from 0 to 60; p is an integer from 0 to 60; q is an integer from 0 to 60; and r is an integer from 2 to 10. Of particular utility are the fluorinated oils which correspond to the formula $F[CF(CF_3)CF_2O]_nCF_2CF_3$, where n is an integer from 10 to 60.

The fluorinated component compatible with the fluorinated oil may also be selected from a wide variety of materials. However, its selection is designed to allow for an aerosol composition to be formed and most desirably formed as a single-phase composition. Thus, the fluorinated component chosen is one, which may have affinity for the fluorinated oil and most desirably increases its miscibility or solubility therewith. The fluorinated component is generally compatible with the fluorinated oil and may be a material, which is partially or completely soluble with the fluorinated oil, depending on the relative proportions of each. It may also be a material which is normally not soluble in or with the oil but can be made to be more miscible or soluble through the addition of other components or by controlling the ambient conditions, e.g., pressure and temperature to render it more compatible with the oil. Alternatively, it may be a compatible material, which is very useful in forming emulsions, dispersions, suspensions and the like.

Single-phase compositions have distinct advantages over dispersions and emulsions in aerosol compositions. Toward this end, single-phase compositions are the more desirable physical form of the present invention, but dispersions, emulsions, suspensions or other combinative forms may be employed. The fluorinated component which is compatible with the fluorinated oil is generally selected from one or more compounds which correspond to the general formulas selected from the group consisting of fluorinated alkanes having 4 to 10 carbon atoms, fluorinated ether compounds corresponding to the formula $R^1OR^2$, where $R^1$ and $R^2$ may be the same or different and are fluorinated alkyl groups having from 1 to 4 carbon atoms, and combinations thereof. Isomers and isomeric mixtures of these compounds are of course contemplated.

Examples of specific fluorinated components which are intended to be used in combination with the fluorinated oil are methoxy-nonafluorobutane and decafluoropentane.

The ratio of fluorinated oil to the fluorinated component compatible therewith is desirably in the range of about 1:2 to about 1:2.8. This range is designed to include single-phase compositions as well as multi-phase compositions. In instances where a multi-phase composition exists, other additives may be incorporated or conditions employed, such as high pressure, to make the multi-phase composition into a single-phase form. Multi-phase compositions may also be shaken or agitated prior to use. Moreover, the compositions of the present invention include those, which may be multi-phase at ambient temperature, yet can exist in a single-phase form under certain conditions of temperature, pressure, and the like.

The compositions of the present invention are designed to be used with a variety of aerosol components. Virtually any material, which can serve as an aerosol component, may be employed. Among the propellants useful are those selected from isobutane, dimethylether, 1,1,1,2-tetrafluoroethane, carbon dioxide and combinations thereof. In one desired form of the present invention, the propellant is soluble in the composition. In addition to the three basic components of the present invention, a variety of additives may be incorporated therein. For example, a number of oil additives may be included, among which are those selected from the group consisting of thermal stabilizers, lubricity modifiers, corrosion inhibitors, anti-wear and extreme pressure agents, oxidation inhibitors, viscosity modifiers, stabilizers and combinations thereof.

Aerosols provide a convenient ready to-use economical package to dispense products that can be used without the need of special curing or application equipment. The industrial MRO market is a business where economics is a key factor that determines the acceptability of a product. The use of capital-intensive equipment severely limits the utility of the product in the industry. The present invention is especially design for industrial MRO applications. Moreover, the aerosol packages of the present invention provide a convenient and economical way to contain volatile liquids that would otherwise quickly evaporate at room temperature in an unsealed container.

The present invention is especially designed to provide a penetrating lubricant composition. Such a composition has a low viscosity to facilitate its penetration into narrow spaces, such as the gap between the threads of a ³⁄₁₆" (4.57 mm) nut and bolt. The combination of a fluorinated oil with a fluorinated solvent, such as solvents commercially sold under trade name VERTREL XF, in aerosol form take advantage of the benefits of the fluorinated chemistry as well as the benefits of the aerosol package.

There are trade-offs in performance when formulating the fluorinated penetrating lubricant compositions. For example, there is a trade-off of high temperature performance when the fluorinated oils decrease in viscosity. This limits the utility of low viscosity fluorinated oils. Moreover, the relative cost of fluorinated oil is roughly fifteen times as expensive at current prices relevant to more conventional petroleum oils.

An article of manufacture is also contemplated in the present invention. Such an article includes a container for packaging a flowable composition; and a flowable composition within the container, the composition including a fluorinated oil, at least one fluorinated component compatible with the oil and a propellant. The ratio of fluorinated oil to the fluorinated component compatible with the oil (e.g., a fluorinated solvent) can be about 1:0.5 to about 1:15. In one desirable embodiment, the ratio of fluorinated oil to fluorinated solvent may be 1:8, more desirably 1:4 and particularly desirably 1:2. In a particularly desirable form, the composition within the container is in a single phase. The container can be fitted with a means for dispensing the flowable composition, such as an aerosol valve means.

In a broad method of use aspect, the invention provides a method of using an inventive composition as described herein to compatibilize incompatible materials, such as those which would ordinarily exist in a two phase system in the absence of the inventive composition. More specifically, the method calls for the step of providing said composition to a mixture of two or more incompatible materials.

In addition, the entire contents of co-pending, commonly-assigned U.S. provisional application Nos. 60/102,280, filed Sep. 29, 1998 and 60/102,281, filed Sep. 29, 1999 are hereby expressly incorporated herein by reference.

The features and advantages of the present invention will be more clearly understood by reference to the following examples, which serve as an illustration of the invention but are not to be construed of limiting the scope of the invention.

EXAMPLES

Example 1

Table 1 shows a series of compositions prepared using a fluorinated oil (KRYTOX GPL-101), a fluorinated component compatible with the oil, such as decafluoropentane (VERTREL XF) and a propellant. These compositions where packaged in conventional aerosol containers and sprayed onto a metal substrate from a distance of about 12" (30.5 cm) at room temperature. The observations as to flowability, icing or freezing and film quality are listed.

TABLE 1

| Formulation Number | GPL-101 (a) | Solvent VERTREL XF (b) | Solvent OXSOL 100 (c) | Propellant A-31 (d) | Propellant DME (e) | Propellant 134a (f) | Observations |
|---|---|---|---|---|---|---|---|
| 1234-02-01 | 19 | 30 | | 178 | | | |
| 1234-02-02 | 29 | 20 | 178 | | | | |
| 1234-02-03 | 39 | 10 | | 178 | | | |
| 1234-02-04 | 49 | | | 178 | | | Poor flow, icing, poor film |
| 1234-02-05 | 49 | 20 | | 158 | | | Poor flow, icing, poor film |
| 1234-02-06 | 49 | 40 | | 138 | | | Poor flow, icing, poor film |
| 1234-02-7 | 49 | 60 | | 118 | | | Poor flow, icing, poor film |
| 1234-02-08 | 49 | 80 | | 98 | | | Poor flow, icing, poor film |
| 1234-02-09 | 49 | 40 | | | 138 | | Poor flow, icing, poor film |
| 1234-02-10 | 49 | 80 | | | 98 | | Poor flow, icing, poor film |
| 1234-02-11 | 25 | 20 | | | 202 | | Good flow, icing, good film |
| 1234-02-12 | 25 | 40 | | | 162 | | Good flow, icing, poor film |
| 1234-02-13 | 25 | 20 | | 202 | | | Poor flow, icing, poor film |
| 1234-02-14 | 25 | 40 | | 162 | | | Poor flow, icing, poor film |
| 1234-05-01 | 49 | 80 | | 98 | | | Poor flow, icing, poor film |
| 1234-05-02 | 49 | 100 | | 78 | | | Good flow, no icing, good film |
| 1234-05-3 | 49 | 120 | | 58 | | | Good flow, no icing, good film |
| 1234-05-04 | 49 | 90 | | 98 | | | Poor flow, icing, poor film |
| 1234-05-05 | 39 | 110 | | 78 | | | Good flow, no icing, good film |
| 1234-05-06 | 39 | 130 | | 58 | | | Good flow, no icing, good film |
| 1234-05-07 | 29 | 100 | | 98 | | | Poor flow, icing, poor film |
| 1234-05-08 | 29 | 120 | | 78 | | | Good flow, icing, poor film |
| 1234-05-09 | 29 | 140 | | 58 | | | Good flow, no icing, poor film |
| 1234-05-10 | 19 | 110 | | 98 | | | Good flow, icing, poor film |
| 1234-05-11 | 19 | 130 | | 78 | | | Poor flow, icing, poor film |
| 1234-05-12 | 19 | 150 | | 58 | | | Good flow, no icing, poor film |
| 1234-06-01 | 49 | | | | | 178 | Good flow, icing, poor film |
| 1234-06-02 | 49 | 90 | | | | 88 | Good flow, no icing, good film |
| 1234-06-03 | 49 | 60 | 60 | | | 58 | Good flow, no icing, poor film |
| 1234-07-01 | 49 | 90 | | | | 88 | Good flow, no icing, good film |
| 1234-07-02 | 49 | 80 | | | | 98 | Good flow, no icing, good film |
| 1234-07-03 | 49 | 70 | | | | 108 | Poor flow, no icing, poor film |
| 1234-07-04 | 49 | 60 | | | | 118 | Poor flow, no icing, good film |
| 1234-07-05 | 49 | 50 | | | | 128 | Good flow, icing, good film |
| 1234-07-06 | 49 | 40 | | | | 138 | Poor flow, icing, poor film |

(a) Refers to the commercially available fluorinated oil having the formula $F[CF(CF_3)CF_2O]_nCF_2CF_3$, where n is 10 to 60, sold under the tradename KRYTOX GPL-101
(b) VERTREL XF is a tradename for the commercially available highly fluorinated compound, decafluoropentane.
(c) OXSOL 100 is a trade name for the commercially available compound, p-chlorobenzotrifluoride.
(d) A-31 refers to the propellant, isobutane.
(e) DME refers to the propellant, dimethylether.
(f) 134a refers to the propellant, 1,1,1,2,-tetrafluoroethane.

As can be seen from the table, various propellants were used in combination with varying amounts of the fluorinated oil and the fluorinated solvent component. As can be seen from the table, the first composition that provided good flowability on the substrate, no icing and good film quality was composition 1234-05-02. This composition contained 49 grams of fluorinated oil, 100 grams of decafluoropentane and 78 grams of isobutane. This composition had a low viscosity, which penetrated the tight spaces of threads on a ¼×20 nut and bolt. In accordance with the findings in Table 1, at least 17% of the total composition, i.e., fluorinated oil plus fluorinated solvent plus propellant, needs to be fluorinated oil in order to provide good film formation. When the fluorinated oil is present in 17% by weight, the composition requires at least 48% of the highly fluorinated component decafluoropentane to prevent freezing. The balance of the compositions can be aerosol propellant.

In compositions where the propellant is tetrafluoroethane, additional benefit of the composition can be realized with respect to non-flammability. For example, composition 1234-06-02, which contains 49 grams of fluorinated oil, 90 grams decafluoropentane and 88 grams of tetrafluoroethane produces a penetrating oil which has excellent flow characteristics, no icing, good film formation and is non-flammable. Such a composition is especially useful under flammable conditions such as energized circuit applications. Typical hydrocarbon-based lubricants, such as WD-40, are flammable and cannot be used under such flammable conditions. The present fluorinated compositions have better chemical resistance and thermostability over hydrocarbon-based lubricants and when combined with certain propellants, can also exhibit non-flammability.

Example 2

Through experimentation, it was determined that when the composition was discharged from the aerosol container, the temperature dropped sufficiently causing moisture to condense from the surrounding atmosphere and freeze, thereby immobilizing the composition. In one series of experiments, the temperature of the metal substrate onto which the composition was sprayed dropped from 71° F. (21° C.) to 33° F. (1° C.) after only 5 seconds. In another experiment, the temperature dropped to −9° F. (−22° C.) after 15 seconds spray. Moisture condensed and froze on the surface causing the oil to remain immobile until the substrate temperature rose above 32° F. (0° C.). This freezing presented several significant problems. The viscosity of the oil when subjected to temperatures below freezing was too high to provide sufficient flowability to penetrate narrow gaps. Such compositions are not effective as penetrating oil compositions. Moreover, the thermodynamic cooling which led to moisture condensing and freezing, kept the oil from flowing even when sprayed on a vertical surface.

The addition of a fluorinated component, which acts as a solvent to the fluorinated oil, provides several advantages. First, it reduces the viscosity of the oil to allow the oil to penetrate narrow gaps. This aids in producing a penetrating oil composition, which penetrates and lubricates tight fitting parts. The solvent may also provide a heat sink to reduce the magnitude of the temperature drop and the resultant moisture condensation. The addition of the solvent also dilutes the amount of propellant in the composition, and serves to reduce the portion of the composition that contributed to the thermodynamic freezing effects. As shown in Table 1 above, the first fifteen compositions listed failed to produce a non-icing spray. As a result, the compositions also produced poor flowability and poor film formation. The sixteenth composition (1234-05-02) is representative of the first non-freezing penetrating oil composition.

Further experiments were conducted to measure the temperature drop for several aerosol penetrating oil compositions. Tables 2-2c below, show the results of such testing. Steel Q-panels 3"×5"×0.020" (76.2 mm×127 mm×0.50 mm) were used as the substrate. For all tests, the aerosol container was held approximately 12" (30.5cm) from the panel at an approximate 90° angle and sprayed at room temperature. The temperature differences of the metal substrate before and after the spray were taken with a Cole Parmer-Infrared thermometer, model 08406-02. (See infra.) Three compositions were prepared: namely 1234-02-05; 1234-05-02 and 1234-05-12. The spray time (seconds), temperature (° F./° C.) of the metal substrate before the spray and after the spray, as well as the spray rate were recorded. Composition 1234-02-05 showed significant freezing on all samples. Heavy icing was observed on trials number 2 and 3. In every case, the temperature of the substrate was significantly lowered after the composition was applied.

TABLE 2

Temperature Drop Measurement for Several Aerosol Penetrating Formulations of

| Formulation (grams) | Formulation Number | GPL-101 | VERTREL XF | Propellant A-31 | 134-a |
|---|---|---|---|---|---|
| Early Freezing Prototype | 1234-02-05 | 49 | 20 | 158 | — |
| First Formulation without freezing | 1234-05-02 | 49 | 100 | 78 | — |
| Critical Ratio to prevent freezing | 1234-05-12 | 49* | 90 | — | 88 |

*GPL-101 contains an inhibitor in this formulation, XP1A1

TABLE 2a

Formulation -- Early Freezing Prototype (1234-02-05)

| Trail | #1 | #2 | #3 |
|---|---|---|---|
| Spray Time (seconds) | 5 | 10 | 15 |
| T1, Metal Temperature Before Spray | 72° F. (22° C.) | 69° F. (21° C.) | 71° F. (22° C.) |
| T2, Metal Temperature After Spray | 35° F. (2° C.) | 24° F. (−4° C.) | −9° F. (−13° C.) |
| Spray Rate, (grams per second) | 1.33 g/s | 1.29 g/s | 1.28 g/s |

Significant freezing observed on all samples.
Heavy icing observed on trials #2 & #3.

TABLE 2b

Formulation - First Formulation without Freezing (1234-05-02)

| Trail | #1 | #2 | #3 |
|---|---|---|---|
| Spray Time, (seconds) | 5 | 10 | 15 |
| T1, Metal Temperature before Spray | 71° F. (22° C.) | 72° F. (22° C.) | 70° F. (21° C.) |
| T2, Metal Temperature After Spray | 40° F. (4° C.) | 29° F. (−2° C.) | 27° F. (−3° C.) |
| Spray Rate (grams per second) | 1.40 g/s | 1.54 g/s | 1.42 g/s |

TABLE 2b-continued

Formulation - First Formulation without Freezing (1234-05-02)

| Trail | #1 | #2 | #3 |
|---|---|---|---|

Good flow on all trials with the slight exception of some minor freezing on trial #3.
Acceptable flow.

TABLE 2c

Formulation -- Ratio to Prevent Freezing (1234-05-12)

| Trail | #1 | #2 | #3 |
|---|---|---|---|
| Spray Time, (seconds) | 5 | 10 | 15 |
| T1, Metal Temperature before Spray | 70° F. (21° C.) | 71° F. (22° C.) | 73° F. (23° C.) |
| T2, Metal Temperature After Spray | 53° F. (12° C.) | 47° F. (8° C.) | 42° F. (6° C.) |
| Spray Rate,(grams per second) | 1.21 g/s | 1.19 g/s | 1.24 g/s |

Great flow, no freezing on any trials.
Conditions:
Steel Q-panel 3" × 5" × 0.020" (76 mm × 127 mm × 50 mm)
Distance from Aerosol to the Q-panel; 12 inches (30.5 cm)
Cole Parmer-Infrared Thermometer: Model 08406-02

Composition 1234-05-02 exhibited a marked improvement over the previously described composition. Good flowability was observed in trials 1 and 2, with acceptable flowability in trial 3. The spray time, temperature before and after spray of the metal substrate and the spray rate were all recorded as with the previous composition.

Composition 1234-05-12 was found to be an extremely effective composition, exhibiting excellent flowability and no freezing on any of the trials. The temperature drop of the metal substrate before and after spray was significantly reduced compare to composition 1234-02-05, and also improved over the previous composition 1234-05-02.

The invention being thus described, it will be clear to those persons of skill in the art that many variations exist, and such variations are not to be regarded as a departure from the spirit and scope of the invention, and all such modifications are intended to be included within the scope of the claims.

What is claimed is:

1. An aerosol composition comprising:
   a) a fluorinated oil;
   b) at least one fluorinated component selected from the group consisting of fluorinated alkanes having from 4 to 10 carbon atoms, fluorinated ether compounds corresponding to the formula $R^1OR^2$ wherein $R^1$ and $R^2$ may be the same or different and are fluorinated alkyl groups having from 1 to 4 carbon atoms, and combinations thereof, wherein said fluorinated component is compatible with said fluorinated oil; and
   c) a propellant, wherein the ratio of said fluorinated oil to said fluorinated component provides a non-icing film when sprayed in ambient conditions.

2. The aerosol composition of claim 1 wherein the ratio of fluorinated oil to fluorinated component is about 1:2 to about 1:2.8.

3. The aerosol composition of claim 1 wherein said ratio of fluorinated oil to fluorinated component is about 1:0.5 to about 1:15.

4. The aerosol composition of claim 1 wherein said fluorinated oil corresponds to one of the general formulas selected from the group consisting of $CF_3CF_2CF_2O-[CF(CF_3)CF_2-O-]_nCF_2CF_3$, $CF_3O-[CF(CF_3)CF_2-O-]_y-[CF_2-O]_mCF_3$, $CF_3O-[CF_2CF_2-O-]_z-[CF_2-O-]_pCF_3$, $CF_3CF_2CF_2-O-[CF_2CF_2CF_2-O-]_qCF_2CF_3$, halocarbons containing the repeating group $-(CF_2CFCl)-_r$, and combinations thereof; wherein n is an integer from 0 to 60; y is an integer from 0 to 60; m is an integer from 0 to 60; z is an integer from 0 to 60; p is an integer from 0 to 60; and q is an integer from 0 to 60; and r is an integer from 2 to 10.

5. The aerosol composition of claim 4, wherein said fluorinated oil corresponds to the formula $F[CF(CF_3)CF_2O]_nCF_2CF_3$, wherein n is an integer from 10 to 60.

6. The aerosol composition of claim 1 wherein said fluorinated component is methoxy-nonafluorobutane.

7. The aerosol composition of claim 1 wherein said fluorinated component is decafluoropentane.

8. The aerosol composition of claim 1 wherein said propellant is selected from the group consisting of isobutane, dimethylether, 1,1,1,2-tetrafluoroethane, carbon dioxide and combinations thereof.

9. The aerosol composition of claim 1 being a stable single phase.

10. The aerosol composition of claim 1 further including an oil additive selected from the group consisting of thermal stabilizers, lubricity modifiers, corrosion inhibitors, anti-wear and extreme pressure agents, oxidation inhibitors, viscosity modifiers, stabilizers and combinations thereof.

11. The aerosol composition of claim 1 being non-flammable or non-combustible.

12. A fluorinated oil composition capable of forming a non-icing aerosol comprising:
   a) a fluorinated oil; and
   b) at least one fluorinated component selected from the group consisting of fluorinated alkanes having from 4 to 10 carbon atoms, fluorinated ether compounds corresponding to the formula $R^1OR^2$ wherein $R^1$ and $R^2$ may be the same or different and are fluorinated alkyl groups having from 1 to 4 carbon atoms, and combinations thereof, wherein said fluorinated component is compatible with said oil, and further wherein the ratio of fluorinated oil to fluorinated component is about 1:0.5 to about 1:15.

13. The fluorinated oil composition of claim 12 wherein said fluorinated oil is a compound corresponding to the general formulas selected from the group consisting of $CF_3CF_2CF_2O$—$[CF(CF_3)CF_2$—$O$—$]_nCF_2CF_3$, $CF_3O$—$[CF(CF_3)CF_2$—$O$—$]_y$—$[CF_2$—$O]_mCF_3$, $CF_3O$—$[CF_2CF_2$—$O$—$]_z[CF_2$—$O$—$]_pCF_3$, $CF_3CF_2CF_2$—$O$—$[CF_2CF_2$—$O$—$]_qCF_2CF_3$, halocarbons containing the repeating group —$(CF_2CFCl)$—$_r$ and combinations thereof; wherein n is an integer from 0 to 60; y is an integer from 0 to 60; m is an integer from 0 to 60; z is an integer from 0 to 60; p is an integer from 0 to 60; and q is an integer from 0 to 60; and r is an integer from 2 to 10.

14. The fluorinated oil composition of claim 12 being in a stable single phase.

15. The fluorinated oil composition of claim 12 further including an aerosol propellant.

16. The fluorinated oil composition of claim 15 wherein said propellant is selected from the group consisting of isobutane, dimethylether, 1,1,1,2-tetrafluoroethane, carbon dioxide and combinations thereof.

17. The fluorinated composition of claim 13 further including an additive selected from the group consisting of thermal stabilizers, lubricity modifiers, corrosion inhibitors, anti-wear and extreme pressure agents, oxidation inhibitors, viscosity modifiers, stabilizers and combinations thereof.

18. An article of manufacture comprising:
  a) a container for packaging a flowable composition;
  b) a flowable composition within said container, said composition comprising:
    i) a fluorinated oil;
    ii) at least one fluorinated component selected from the group consisting of fluorinated alkanes having from 4 to 10 carbon atoms, fluorinated ether compounds corresponding to the formula $R^1OR^2$ wherein $R^1$ and $R^2$ may be the same or different and are fluorinated alkyl groups having from 1 to 4 carbon atoms, and combinations thereof, wherein said fluorinated component is compatible with said oil; and
    iii) a propellant,
  wherein said composition is non-icing when sprayed from said container in ambient conditions.

19. The article of manufacture of claim 18, wherein the ratio of fluorinated oil to fluorinated component is about 1:1 to about 1:15.

20. The article of manufacture of claim 18, wherein said fluorinated oil corresponds to one of the general formulas selected from the group consisting of $CF_3CF_2CF_2O$—$[CF(CF_3)CF_2$—$O$—$]_nCF_2CF_3$, $CF_3O$—$[CF(CF_3)CF_2$—$O$—$]_y$—$[CF_2$—$O]_mCF_3$, $CF_3O$—$[CF_2CF_2$—$O$—$]_z$—$[CF_2$—$O$—$]_pCF_3$, $CF_3CF_2CF_2$—$O$—$[CF_2CF_2CF_2$—$O$—$]_qCF_2CF_3$, halocarbons containing the repeating group —$(CF_2CFCl)$—$_r$ and combinations thereof; wherein n is an integer from 0 to 60; y is an integer from 0 to 60; m is an integer from 0 to 60; z is an integer from 0 to 60; p is an integer from 0 to 60; and q is an integer from 0 to 60; and r is an integer from 2 to 10.

21. The article of manufacture of claim 18, wherein said fluorinated component is decafluoropentane.

22. The article of manufacture of claim 18, wherein said fluorinated component is methoxy-nonafluorobutane.

23. The article of manufacture of claim 18, wherein said propellant is selected from the group consisting of isobutane, dimethylether, 1,1,1,2-tetrafluoroethane, carbon dioxide and combinations thereof.

24. The article of manufacture of claim 18, being in a stable single phase.

25. The article of manufacture of claims 18, further including an oil additive selected from the group consisting of thermal stabilizers, lubricity modifiers, corrosion inhibitors, anti-wear and extreme pressure agents, oxidation inhibitors, viscosity modifiers, stabilizers and combinations thereof.

26. A method of preparing a non-icing fluorinated aerosol composition comprising:
  a) providing a fluorinated oil;
  b) providing a fluorinated component compatible with said oil, wherein said fluorinated component is selected from the group consisting of fluorinated alkanes having from 4 to 10 carbon atoms, fluorinated ether compounds corresponding to the formula $R^1OR^2$ wherein $R^1$ and $R^2$ may be the same or different and are fluorinated alkyl groups having from 1 to 4 carbon atoms, and combinations thereof
  c) combining said fluorinated oil with at lease one said fluorinated component; and
  d) further combining the resultant combination with a propellant;
  wherein the ratio of fluorinated oil to fluorinated component is about 1:0.5 to about 1:15.

27. The method of claim 26, further including the step of adjusting said ratio to obtain a single phase.

28. A method of cleaning an oil-bearing surface by contacting said surface with a fluorinated aerosol composition, said composition comprising the composition of claim 1.

29. A method of delivering a fluorinated oil to a surface comprising contacting a surface to be lubricated with the composition of claim 12.

30. A method of using the composition according to claim 1 to compatibilize incompatible materials, a step of which comprises:
  a) providing said composition to a mixture of two or more incompatible materials to produce a substantially single phase composition therefrom.

* * * * *

UNITED STATES PATENT AND TRADEMARK OFFICE
CERTIFICATE OF CORRECTION

PATENT NO. : 6,303,549 B1
DATED : October 16, 2001
INVENTOR(S) : Matthew P. Burdzy et al.

It is certified that error appears in the above-identified patent and that said Letters Patent is hereby corrected as shown below:

Column 1,
Line 13, change "an" to -- a --

Column 2,
Line 49, change "maybe" to -- may be --

Column 4,
Line 4, change "design" to -- designed --
Line 64, change "where" to -- were --

Column 8,
Table 2a, line 3, change "Trail" to -- Trial --
Table 2b, line 3, change "Trail" to -- Trial --

Column 9,
Table 2b-continued, line 3, change "Trail" to -- Trial --
Table 2c, line 3, change "Trail" to -- Trial --
Line 35, change "compare" to -- compared --

Column 12,
Line 12, change "claims" to -- claim --
Line 30, change "lease" to -- least --

Signed and Sealed this

Twenty-third Day of July, 2002

*Attest:*

*Attesting Officer*

JAMES E. ROGAN
*Director of the United States Patent and Trademark Office*